UNITED STATES PATENT OFFICE.

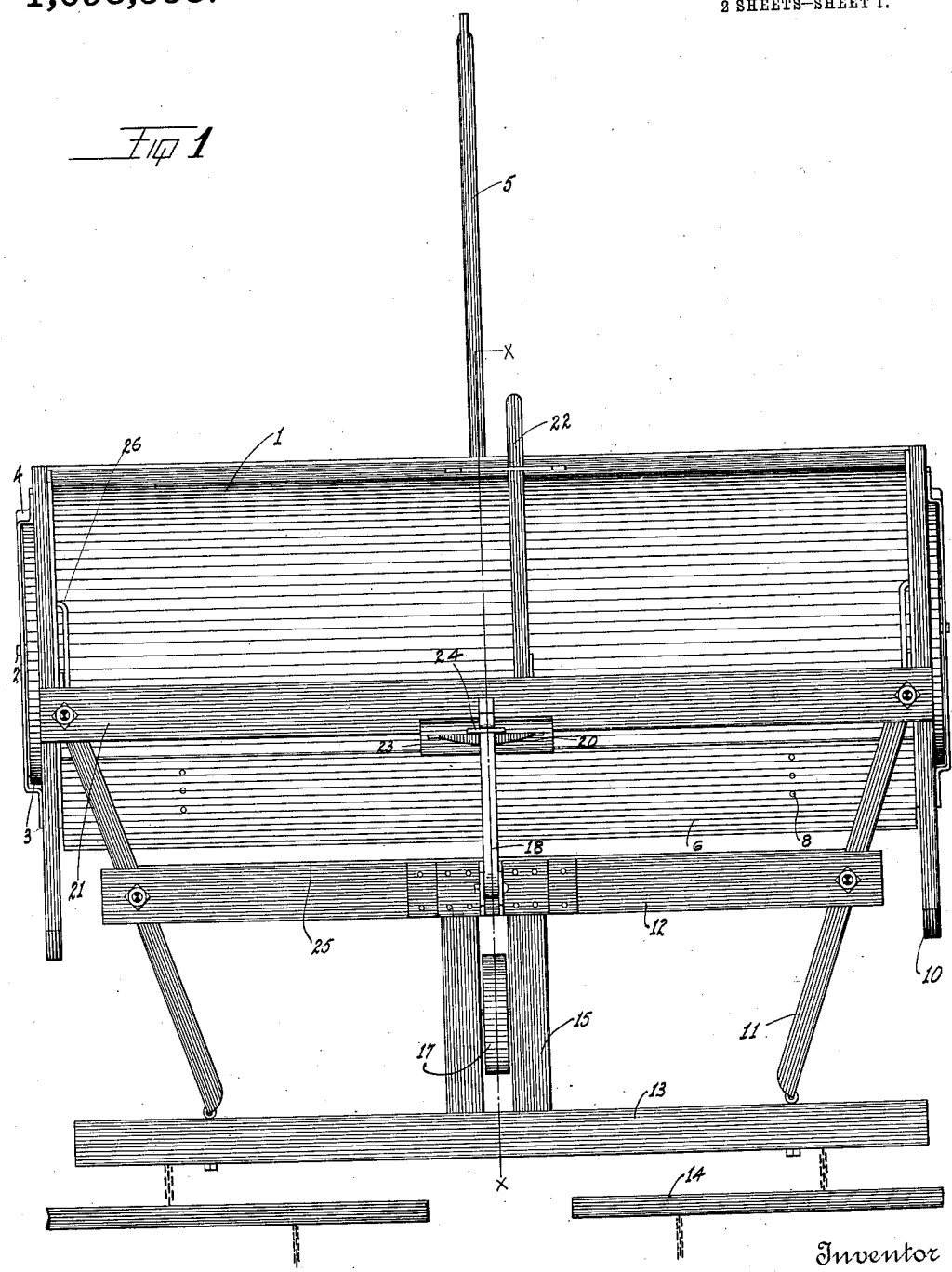

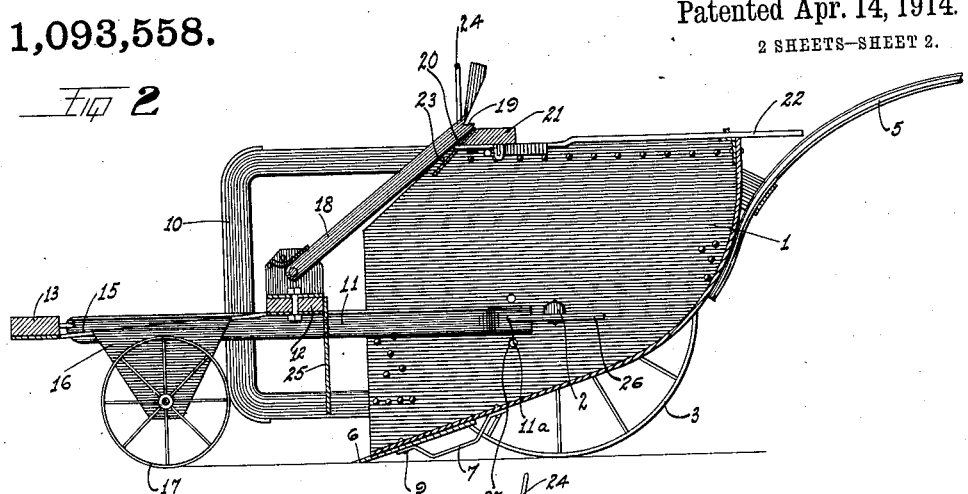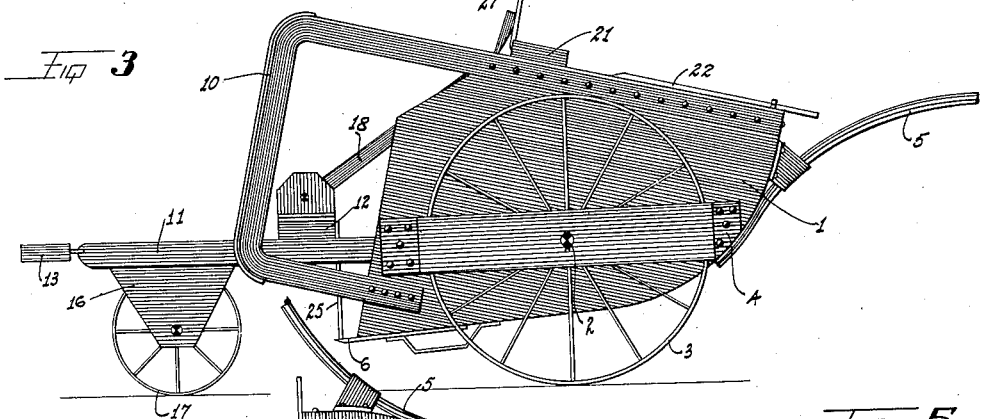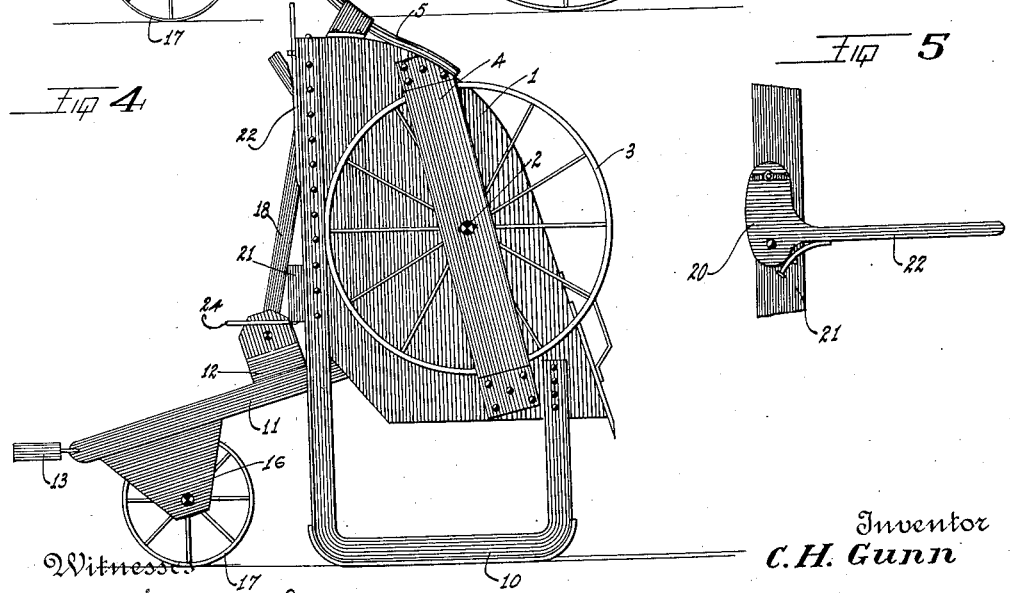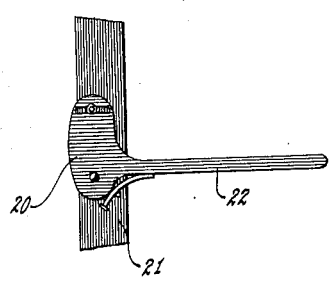

CHARLES H. GUNN, OF MODESTO, CALIFORNIA.

SCRAPER.

1,093,558.  Specification of Letters Patent.  Patented Apr. 14, 1914.

Application filed January 6, 1913. Serial No. 740,318.

*To all whom it may concern:*

Be it known that I, CHARLES H. GUNN, a citizen of the United States, residing at Modesto, in the county of Stanislaus, State of California, have invented certain new and useful Improvements in Scrapers; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in scrapers, and particularly to wheeled scrapers, the object of the invention being to produce a wheeled scraper which will be able to assume and hold three distinct positions, namely, a loading position, a load carrying position and a dumping position. These three positions are designed to be obtained by a small amount of exertion on the part of the operator and also in such a manner as will permit the load to be gathered and carried much more easily than in the present form of scraper.

A further object of the invention is to produce a simple and inexpensive device, and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a top plan view of the complete device. Fig. 2 is a sectional view taken on a line X—X of Fig. 1 showing the scraper in loading position. Fig. 3 is a side elevation of the scraper showing the same in the load carrying position. Fig. 4 is a sectional view showing the scraper in dumping position. Fig. 5 is a bottom plan view of a spring catch mechanism.

Referring now more particularly to the characters of reference on the drawings, the numeral 1 designates the bowl of the scraper having pins 2 upon which are mounted wheels 3 interposed in retaining straps 4. The said bowl 1 is provided with a rearwardly projecting handle member 5 and at its forward lower edge is provided with a cutting blade 6. The bottom of the bowl 1 just to the rear of the blade 6 is provided with guide runners 7 adjustable transversely along said bottom by means of a plurality of holes 8 and bolts 9. The position of these guide runners as will be seen will determine the depth at which the scraper will cut and may be moved to give a deeper or shallower cut as may be desired. Projecting on each end of the bowl 1 are the usual dumping sleds or runners 10, the use of which will be described hereinafter. Pivotally mounted as at 11ª on each end of the bowl 1 is a projecting beam 11 carrying a rigid cross beam 12 disposed intermediate its ends and another beam 13 on its outer ends adapted to receive the whiffletrees 14. Projecting between the beams 12 and 13 are two spaced beams 15 carrying a frame 16 in which is journaled a front runner wheel 17. Pivotally mounted on the beam 12 is a projecting arm 18 carrying a catch 19 on its upper end adapted to normally engage a spring pressed plate 20 pivoted underneath a cross beam 21 on the top of the bowl 1, which plate is provided with a projecting handle 22 adapted to be within reach of the operator.

The numeral 23 designates a guide plate over which the member 18 moves to hold it always in position as will appear and similarly the numeral 24 designates a guide frame through which the member 18 moves.

In practice the bowl 1 is held in normal carrying position by means of the catch 19 engaging the plate 20, which position brings the plate 6 against a closing board 25 depending from the beam 12 which causes the bowl 1 to be in a position to carry the load without loss. When the bowl 1 is in this carrying position and it is empty and it is desired to scrape the same full, the operator uses the handle 22 to disengage the plate 20 from the catch 19 and then by operating the handle 5, the bowl 1 is tilted on its pivotal points around the axles 2 to the digging position as shown in Fig. 2. Then with the forward movement of the scraper, the bowl 1 is filled with dirt and then the operator uses the handle 5 to pull the same to closed carrying position as shown in Fig. 3, at which time the catch 19 engages the plate 20 and holds the same in that position and then this throws the weight equally upon the wheels 3 and the wheel 17 and the load can then be carried to any point desired and then without disengaging the catch 19 from the plate 20, the handle 5 can be operated to tilt the bowl 1 and its wheels on the pivotal points 11ª and onto its sled or runners 10 in the position as shown in Fig. 4, which movement dumps the dirt and the device can then be returned to the closed carrying position ready for further operation. As will be noted the guide 24 holds the member 18 and the catch 19 always in position ready to drop into place to lock into engagement with the plate 20.

The members 11 are secured to the ends of the bowl 1 by means of U-bolts 26 and there are a plurality of holes 27 in the bowl 1 at one end of said U-bolt whereby the points at which the said members 11 are pivoted can be changed in order to vary the angle at which the bowl projects during the scraping operation in order to make a deeper or shallower cut as may be desired.

From the foregoing description it will be readily seen that I have produced such a device as substantially fulfils the objects of the invention as set forth herein.

While this specification sets forth in detail the present and preferred construction of the invention, still in practice, such deviations from such detail may be resorted to as do not form a departure from the spirit of the invention.

Having thus described my invention what I claim as new and useful and desire to secure by Letters Patent is:

A device of the character described comprising a scraper bowl mounted on wheels, draw beams flexibly connected with the inside of the ends of said scraper bowl, a rigid cross beam secured to said draw beams intermediate their ends, another cross beam secured to the outer ends of said draw beams, a pair of spaced beams rigidly secured centrally across said cross beams, a frame carried by said pair of beams, a wheel disposed in said frame, a beam rigidly disposed across the top of said scraper bowl, a catch on said last named beam, a latch on the beam secured centrally on said draw beams, said latch being adapted to engage said catch, and a handle member on said bowl, as described.

In testimony whereof I affix my signature in presence of two witnesses.

CHARLES H. GUNN.

Witnesses:
STEPHEN M. BLEWETT,
CLARENCE M. SMITH.